(12) United States Patent
Yokose (10) Patent No.: US 11,410,339 B2
(45) Date of Patent: Aug. 9, 2022

(54) ENCODING DEVICE, DECODING DEVICE, AND NON-TRANSITORY COMPUTER READABLE MEDIUM

(71) Applicant: FUJIFILM Business Innovation Corp., Tokyo (JP)

(72) Inventor: Taro Yokose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 232 days.

(21) Appl. No.: 16/538,801

(22) Filed: Aug. 12, 2019

(65) Prior Publication Data
US 2020/0058138 A1   Feb. 20, 2020

(30) Foreign Application Priority Data
Aug. 20, 2018   (JP) .............................. JP2018-153878

(51) Int. Cl.
 G06T 15/00  (2011.01)
 G06T 9/00   (2006.01)
 B33Y 50/02  (2015.01)
 G06T 15/08  (2011.01)

(52) U.S. Cl.
 CPC ................ *G06T 9/00* (2013.01); *B33Y 50/02* (2014.12); *G06T 15/08* (2013.01)

(58) Field of Classification Search
 CPC ........... B33Y 50/02; G06T 9/00; G06T 9/001; G06T 9/004; G06T 15/08
 USPC ....................................................... 345/418
 See application file for complete search history.

(56) References Cited

U.S. PATENT DOCUMENTS

| 5,828,789 | A   |    | 10/1998 | Yokose et al. |
| 6,636,642 | B1  |    | 10/2003 | Yokose |
| 10,922,847 | B2 | *  | 2/2021  | Yokose ..................... G06T 9/00 |
| 11,182,929 | B2 | *  | 11/2021 | Nguyen ................ G06T 7/0006 |
| 2020/0273210 | A1 | * | 8/2020  | Nguyen .................. G06T 9/002 |

(Continued)

FOREIGN PATENT DOCUMENTS

| JP | 2888186    | 5/1999 |
| JP | 3885413    | 2/2007 |
| JP | 2007-166492 | 6/2007 |

OTHER PUBLICATIONS

Takahashi et al, FAV File Format Specification, Social Fabrication Laboratory of Keio University at Shonan Fujisawa Campus (SFC), Version 1.0, Jul. 12, 2016.*

(Continued)

*Primary Examiner* — Phu K Nguyen
(74) *Attorney, Agent, or Firm* — JCIPRNET (57) ABSTRACT

An encoding device includes a voxel-data acquiring unit and an encoding unit. The voxel-data acquiring unit acquires voxel data expressing a three-dimensional object to be fabricated and containing, for each voxel constituting the three-dimensional object, a value of the voxel and link information indicating a link direction of the voxel. The encoding unit encodes the voxel data by setting a code based on a predicting unit that has made a correct prediction of a value of a target voxel among multiple predicting units that predict the value of the target voxel based on a value of at least one reference voxel surrounding the target voxel, the target voxel being encoded based on the link information of the target voxel.

12 Claims, 7 Drawing Sheets

(56) References Cited

U.S. PATENT DOCUMENTS

2021/0276270 A1* 9/2021 Luan .................. B33Y 10/00
2021/0283717 A1* 9/2021 Iyer .................. B23K 26/073

OTHER PUBLICATIONS

Choy CB, Xu D, Gwak J, Chen K, Savarese S. 3d-r2n2: A unified approach for single and multi-view 3d object reconstruction. InEuropean conference on computer vision Oct. 8, 2016 (pp. 628-644). Springer, Cham.*

Khanzadeh M, Rao P, Jafari-Marandi R, Smith BK, Tschopp MA, Bian L. Quantifying geometric accuracy with unsupervised machine learning: Using self-organizing map on fused filament fabrication additive manufacturing parts. Journal of Manufacturing Science and Engineering. Mar. 1, 2018;140(3).*

Tanaka, Deep Learning for Advanced 3D Printing, Keio University, JST Center of Innovation Program, 2016, pp. 1-23.*

Chen Y, Gao H, Cai L, Shi M, Shen D, Ji S. Voxel deconvolutional networks for 3D brain image labeling. InProceedings of the 24th ACM SIGKDD International Conference on Knowledge Discovery & Data Mining Jul. 19, 2018 (pp. 1226-1234).*

Tahir R, Sargano AB, Habib Z. Voxel-Based 3D Object Reconstruction from Single 2D Image Using Variational Autoencoders. Mathematics. Jan. 2021;9(18):2288.*

Bader C, Kolb D, Weaver JC, Sharma S, Hosny A, Costa J, Oxman N. Making data matter: Voxel printing for the digital fabrication of data across scales and domains. Science advances. May 1, 2018;4(5):eaas8652.*

Murphy et al, 2018. Using autoencoded voxel patterns to predict part mass, required support material, and build time. In 2018 International Solid Freeform Fabrication Symposium. University of Texas at Austin. Aug. 13-15, 2018.*

Chowdhury S, Mhapsekar K, Anand S. Part build orientation optimization and neural network-based geometry compensation for additive manufacturing process. Journal of Manufacturing Science and Engineering. Mar. 1, 2018;140(3).*

Tomonari Takahashi et al., Fuji Xerox Technical Report No. 26, "The Next-Generation 3D Printing Data Format FAV, Which Enables an Unprecedented Wide Range of Expression", Nov. 28, 2018, with English abstract, Available at: https://www.fujixerox.co.jp/company/technical/tr/2017/pdf/s_07.pdf.

* cited by examiner

ENCODING DEVICE, DECODING DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-153878 filed Aug. 20, 2018.

BACKGROUND

(i) Technical Field

The present disclosure relates to encoding devices, decoding devices, and non-transitory computer readable media.

(ii) Related Art

Three-dimensional fabrication apparatuses, such as three-dimensional (3D) printers, are becoming widely available. Data formats widely used in 3D printers include formats that describe three-dimensional shapes using polygonal mesh expressions, such as a standard triangulated language (STL) format and a 3DS format.

Furthermore, the present applicants have proposed a data format called "FAV" that uses voxel expression to describe a three-dimensional model to be fabricated using a 3D printer (see TAKAHASHI, Tomonari and FUJII, Masahiko, "The Next-Generation 3D Printing Data Format FAV, Which Enables an Unprecedented Wide Range of Expression" [online], Fuji Xerox Technical Report, No. 26, 2017 [Searched on Jul. 1, 2018], Internet <URL: https://www.fujixerox.co.jp/company/technical/tr/2017/pdf/s_07.pdf>). An FAV format provides a voxel with various attributes, such as color, material, and link strength with another voxel, so that various characteristics other than the three-dimensional shape are expressible.

As it is presumable from the fact that the data volume of bit-map expression of a two-dimensional full-color image is enormous, the volume of data in a voxel format (referred to as "voxel data" hereinafter) expressing a three-dimensional object is extremely enormous especially in a case where each voxel is given various attributes, such as color. An encoding method that may reduce the volume of voxel data is in demand.

Japanese Unexamined Patent Application Publication No. 2007-166492 and Japanese Patent Nos. 2888186 and 3885413 each disclose an encoding method that reduces the data volume of a two-dimensional image.

An image processing device disclosed in Japanese Unexamined Patent Application Publication No. 2007-166492 extracts encoding information in an original encoding process when decoding input encoded data, estimates the encoding efficiency, after performing image processing on the decoded image data, based on the contents of the image processing and the extracted encoding information, and uses the estimated encoding efficiency to control the encoding amount with respect to the image-processed image data. Consequently, the encoding amount may be controlled in one path.

In an encoding device disclosed in Japanese Patent No. 2888186, when any one of prediction results obtained by pixel-value predicting units matches a target pixel, an identifier of the matching pixel-value predicting unit is encoded by an encoding unit. If none of the prediction results matches the target pixel, a prediction error of a prediction-error calculating unit is encoded by the encoding unit. In a decoding device, a code is decoded to the identifier or the prediction error, pixel data is output from the relevant pixel-value predicting unit based on the identifier, and pixel data is extracted from a prediction-error adding unit based on the prediction error.

In an encoding device disclosed in Japanese Patent No. 3885413, a first predicting unit and a second predicting unit each predict a pixel value of a target pixel based on image data by using respective predetermined techniques, and each generate prediction-value data. A run counter compares the image data with the prediction-value data, and adds 1 to the run count value of the relevant predicting unit if the predicting unit has made a correct prediction and has been continuously running until an immediately previous pixel. If there is not even a single predicting unit that has made a correct prediction and that has been continuously running until an immediately previous pixel, the run up to the immediately previous pixel is transmitted as run data to a selecting unit together with the identification number of the predicting unit. The selecting unit selectively outputs, as encoded data, the run value, the identification number, or prediction-error data from a prediction-error calculating unit.

SUMMARY

Aspects of non-limiting embodiments of the present disclosure relate to a device that performs predictive encoding on voxel data and that reduces the volume of data to be encoded, as compared with a case where information about a link direction of each of voxels contained in the voxel data is not taken into account.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an encoding device including a voxel-data acquiring unit and an encoding unit. The voxel-data acquiring unit acquires voxel data expressing a three-dimensional object to be fabricated and containing, for each voxel constituting the three-dimensional object, a value of the voxel and link information indicating a link direction of the voxel. The encoding unit encodes the voxel data by setting a code based on a predicting unit that has made a correct prediction of a value of a target voxel among multiple predicting units that predict the value of the target voxel based on a value of at least one reference voxel surrounding the target voxel, the target voxel being encoded based on the link information of the target voxel.

BRIEF DESCRIPTION OF THE DRAWINGS

Exemplary embodiments of the present disclosure will be described in detail based on the following figures, wherein.

DETAILED DESCRIPTION

An encoding device according to an exemplary embodiment is configured to encode voxel data for three-dimensional fabrication.

Voxel data defines, for example, a three-dimensional object to be fabricated in a three-dimensional fabrication apparatus in accordance with a group of voxels. Voxels are elements serving as units of a three-dimensional object and are individually accommodated in small dice-shaped spaces that divide a three-dimensional space encapsulating the three-dimensional object into a grid pattern by using evenly-spaced lines parallel to x, y, and z coordinate axes. These small spaces will be referred to as grid positions or cells hereinafter. Each small space is cubical. In a typical example, a voxel is a cubical element that occupies the entire small space, but the shape of a voxel is not limited to this. Each voxel has at least one attribute, such as the color, material, or relational strength (e.g., link strength) with a neighboring voxel. The grid positions within the space include grid positions having voxels constituting the three-dimensional object and grid positions not having such voxels. The voxel data contains, for each grid position, information indicating whether or not a voxel exists at the grid position and information indicating at least one attribute of a voxel if the grid position has the voxel. The FAV format described in TAKAHASHI, Tomonari and FUJII, Masahiko, "The Next-Generation 3D Printing Data Format FAV, Which Enables an Unprecedented Wide Range of Expression" [online], Fuji Xerox Technical Report, No. 26, 2017 [Searched on Jul. 1, 2018], Internet <URL: https://www.fujixerox.co.jp/company/technical/tr/2017/pdf/s_07.pdf> is an example of a data format capable of expressing such voxel data.

Examples of attributes that a voxel may have include color, material, and link information. Link information contains information contents based on which a link direction of the voxel is identifiable. A link direction is the direction in which the structural link with the voxel (e.g., the link strength between voxels) is strong in the three-dimensional object. For example, link information of a voxel in the FAV format contains, for each neighboring voxel adjacent to the voxel, a link strength value between the voxel and the neighboring voxel. In a case where six neighboring voxels are to be taken into account, the link information contains an array of six link strength values arranged in a predetermined sequence defined with respect to the neighboring voxels. Based on such an array of link strength values with respect to the neighboring voxels, for example, a direction extending from the voxel (i.e., a target voxel for which the link direction is to be set) toward the neighboring voxel with the maximum link strength is set as the link direction. There is another conceivable method as an alternative to this method of simply setting the direction with the maximum link strength as the link direction. For example, if there are multiple neighboring voxels that rival one another with respect to the link strength with the voxel (i.e., when the difference in link strength therebetween is small, such as when the difference is small than or equal to a threshold value), it may be determined which one of the directions is to be set as the link direction from among the multiple neighboring voxels surrounding the voxel by referring to the link directions of voxels with already-identified link directions. In a case where there is one neighboring voxel with an already-identified link direction in the periphery of the voxel, if any of the directions of the multiple neighboring voxels rivaling one another with respect to the link strength with the voxel matches the link direction of the one neighboring voxel, the matching direction may be set as the link direction of the voxel. In a case where there are multiple neighboring voxels with already-identified link directions in the periphery of the voxel, the direction that matches the largest number among the directions of the multiple neighboring voxels rivaling one another with respect to the link strength with the voxel may be set as the link direction of the voxel.

The link direction is referred to when the three-dimensional fabrication apparatus performs fabrication based on voxel data. For example, if the three-dimensional fabrication apparatus is to form multiple layers while fabricating each layer based on voxel data of a multilayer structure, the three-dimensional fabrication apparatus refers to the link direction in the same layer and performs fabrication in that direction. If fabrication is to be performed by stacking a subsequently layer over an already-fabricated layer, the three-dimensional fabrication apparatus refers to the link direction and fabricates the subsequent layer such that the subsequent layer overlies the already-fabricated layer in that direction. Although the three-dimensional fabrication apparatus refers to the link direction in the above example, an alternative apparatus other than the three-dimensional fabrication apparatus may refer to the link direction. For example, another apparatus may refer to the link direction as preprocessing of the three-dimensional fabrication apparatus, and may create data to be transmitted to the three-dimensional fabrication apparatus.

The link information of a voxel is not limited to the link information in the FAV format mentioned above. Information in another format is permissible so long as the information contains information contents based on which the link direction is determinable.

Such link information is set when, for example, voxel data expressing a three-dimensional object is created. This setting process may be performed by the designer who designs the three-dimensional object. Furthermore, when three-dimensional data in a different format (such as a solid model) of a three-dimensional object designed using a computer-aided design (CAD) system is to be converted into voxel data, a tool that executes the conversion may generate the link information between voxels based on information containing a material and other attributes of the three-dimensional data of the different format.

In this exemplary embodiment, encoding efficiency may be enhanced in a voxel-data encoding process by taking into account the link direction of a voxel.

The link that a voxel has with a neighboring voxel located in the link direction is stronger than the link that the voxel has with neighboring voxels in other directions. Therefore, it is conceivable that the link with respect to attribute values (such as the color and material) of neighboring voxels is stronger between voxels in the link direction than between voxels in directions other than the link direction. In other words, it is conceivable that the attribute values of voxels have a higher correlation in the link direction. In this exemplary embodiment, a link-direction-dependent predictive encoding process is performed when encoding a voxel.

Specifically, the encoding process according to this exemplary embodiment is performed as follows. Of voxels to be referred to (referred to as "reference voxels" hereinafter) when predictively encoding a voxel to be encoded (referred to as "target voxel" hereinafter), a voxel located in the link direction relative to the target voxel is treated in priority over a voxel not located in the link direction relative to the target voxel. The reference voxel located in the link direction relative to the target voxel will be referred to as "link-direction voxel" hereinafter.

For example, in a system that encodes identification information, which indicates a predicting unit that has made a correct prediction among multiple predicting units that predict a value of the target voxel by using one or more reference voxels, as information indicating the value of the target voxel, a code set in correspondence with the identification information of the predicting unit is allocated in a manner such that the link-direction voxel is prioritized. Specifically, if there are multiple predicting units with "the same condition other than the degree of contribution of the link-direction voxel", a shorter code is allocated to a predicting unit with the higher "degree of contribution of the link-direction voxel" among the multiple predicting units.

The expression "the same condition other than the degree of contribution of the link-direction voxel" indicates that, for example, the distance from the target voxel to a reference voxel appearing in a prediction expression that a predicting unit uses for a prediction is the same among the multiple predicting units and that the prediction expression is of the same type among the multiple predicting units. For example, it is assumed that there are five reference voxels A, B, C, D, and E relative to a target voxel X, the distance from the target voxel X to the reference voxels A, B, and C is 1 (i.e., the reference voxels A, B, and C are adjacent to the target voxel X), and the distance from the target voxel X to the reference voxels D and E is 2. It is assumed that the reference voxel A is a link-direction voxel, and the remaining reference voxels are not link-direction voxels. In order to simply the description below, a prediction value of the target voxel X calculated by a predicting unit is defined as X, and a reference voxel Y (Y being any one of A to E) used for calculating the prediction value is defined as Y. In this example, if there are a predicting unit α that predicts that X=A, a predicting unit β that predicts that X=B, and a predicting unit δ that predicts that X=D, the predicting units α and β use the same type of prediction expressions except for using the different reference voxels and are located at the same distance from the target voxel X to the reference voxels to be used, and thus correspond to "the same condition other than the degree of contribution of the link-direction voxel". In contrast, the predicting units α and δ use the same type of prediction expressions but are located at different distances from the target voxel X to the reference voxels A and D, and thus do not correspond to "the same condition other than the degree of contribution of the link-direction voxel". Furthermore, a predicting unit μ that predicts that X=(2A+D)/3 and a predicting unit ν that predicts that X=(2B+E)/3 use the same type of prediction expressions except for using the different reference voxels and are located at the same distance from the target voxel X to the reference voxels to be used in the corresponding terms in the expressions, and thus correspond to "the same condition other than the degree of contribution of the link-direction voxel".

The expression "the degree of contribution of the link-direction voxel" indicates the degree by which a link-direction voxel contributes to a prediction value predicted by a predicting unit. For example, in a prediction expression used by a predicting unit, a percentage occupied by a link-direction voxel is an example of the degree of contribution thereof. For example, the degree of contribution of the link-direction voxel with respect to the predicting unit α mentioned above (X=A, A being a value of the link-direction voxel) is 1 (i.e., 100%), and the degree of contribution of the link-direction voxel with respect to the predicting unit β is 0. Furthermore, the degree of contribution of the link-direction voxel with respect to the predicting unit μ that predicts that X=(2A+D)/3 is ⅔ (66%), and the degree of contribution of the link-direction voxel with respect to the predicting unit ν that predicts that X=(2B+E)/3 is 0.

An example of a conceivable method involves ranking the multiple predicting units and allocating shorter codes to higher-ranked predicting units. In this method, if there are multiple predicting units that perform predictions in the same condition other than a condition of whether or not a reference voxel used for a prediction is a link-direction voxel (i.e., the same type of prediction expressions and the same distance from the target voxel to the reference voxel to be used), predicting units with the higher degree of contribution of the link-direction voxel are set at higher ranks.

Because the correlation of voxel values (attribute values) in the link direction is high, it is conceivable that a predicting unit with a higher degree of contribution of the link-direction voxel tends to make a correct prediction. By allocating shorter codes to predicting units that tend to make correct predictions, the overall encoding amount is reduced, thereby achieving enhanced encoding efficiency.

Furthermore, in another encoding method that preferentially treats the link-direction voxel in accordance with this exemplary embodiment, if there are multiple predicting units that have correctly predicted the value of the target voxel and if these multiple predicting units satisfy "the same condition other than the degree of contribution of the link-direction voxel", the identification information of the predicting unit with the highest "degree of contribution of the link-direction voxel" is encoded as information expressing the value of the target voxel. Since a predicting unit with a higher degree of contribution of the link-direction voxel tends to successively make a correct prediction, it is expected that the average run length may be increased when run-length encoding is performed. Moreover, by combining this method with the method of allocating a relatively shorter code to a predicting unit with a higher "degree of contribution of the link-direction voxel", further enhanced encoding efficiency may be expected.

The concept of encoding according to this exemplary embodiment has been described above. Next, an example of the configuration of the encoding device according to this exemplary embodiment will be described with reference to FIG. 1.

Figure 1:
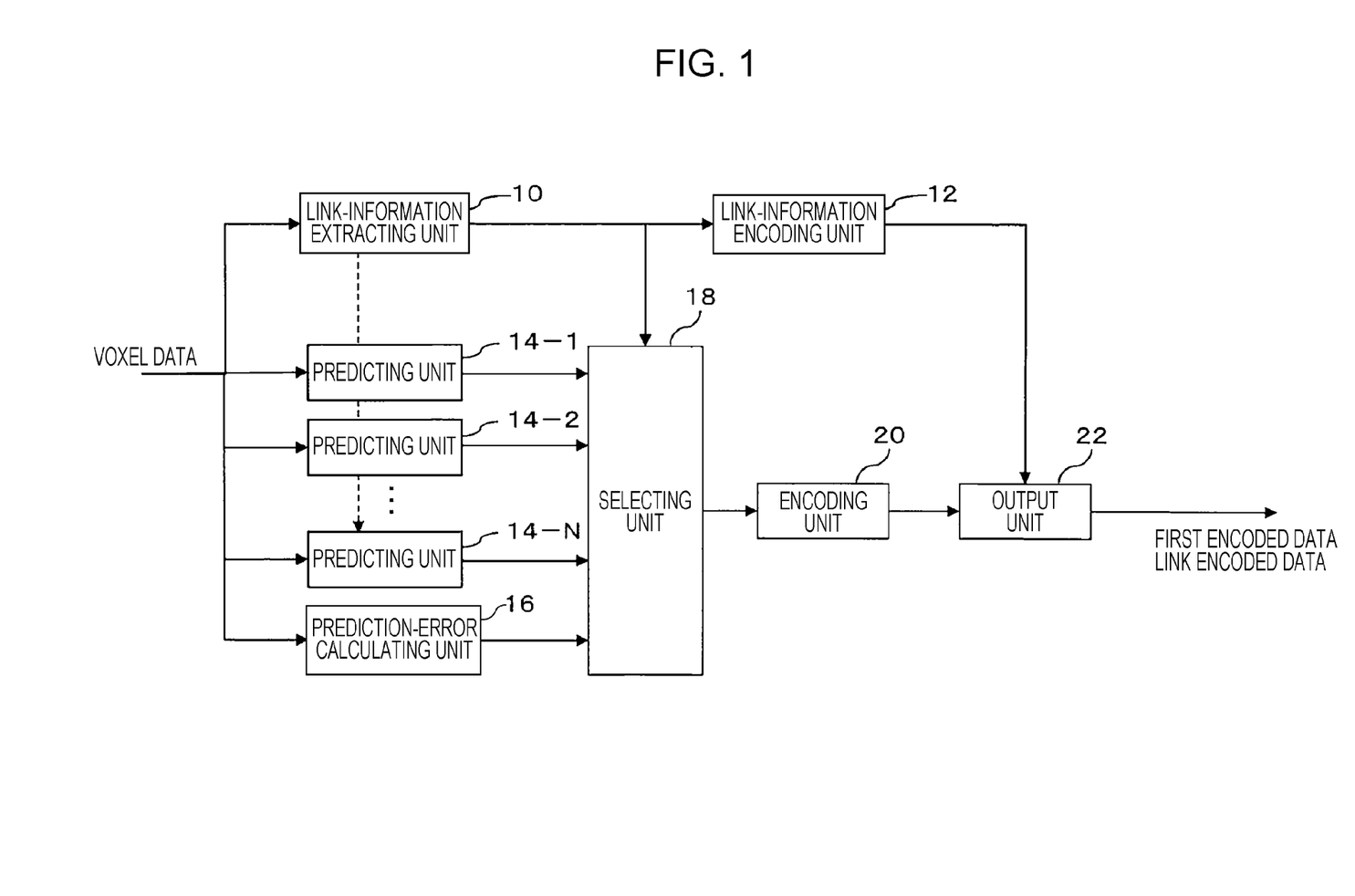
FIG. 1 illustrates a functional configuration of an encoding device.

The encoding device shown in FIG. 1 includes a link-information extracting unit 10, a link-information encoding unit 12, predicting units 14-1, 14-2, . . . , and 14-N (N being an integer larger than or equal to 2) (collectively referred to as "predicting units 14" hereinafter if they do not have to be distinguished from one another), a prediction-error calculating unit 16, a selecting unit 18, an encoding unit 20, and an output unit 22.

The encoding device receives voxel data to be encoded. The voxel data contains link information of each voxel. The link-information extracting unit 10 extracts the link information from the voxel data. In a case where the voxel data is in the FAV format, the link information is contained as a link map in the voxel data. Therefore, the link-information extracting unit 10 extracts the link map from the voxel data. The extracted link information is input to, for example, the link-information encoding unit 12, the predicting units 14, and the selecting unit 18.

The link-information encoding unit 12 encodes the input link information. In this case, the encoding method is not particularly limited. The link-information encoding unit 12 may encode the link information by using an existing method or any encoding method to be developed in the future. Link encoded data, which is an encoded result obtained by the link-information encoding unit 12, is output in correspondence with first encoded data generated by the predicting units 14 to the encoding unit 20, to be described below, and is transmitted toward the decoding side.

The N predicting units 14 predict attribute values (such as the color and material) other than the link information about a target voxel within the voxel data from attribute values of reference voxels surrounding the target voxel. The predicting units 14 determine a prediction value of the color of the target voxel by using different methods. The expression "different methods" includes a case where the reference voxels that the predicting units 14 use for the predictions vary and a case where the prediction expressions used when an attribute value of the target voxel is predicted from the attribute value of at least one reference voxel vary.

In an example shown in FIG. 2, five voxels, namely, voxels B and C immediately in front of a target voxel X in a target layer in a first scanning direction and a second scanning direction for encoding, a voxel A immediately below the target voxel X in the target layer, and voxels D and E immediately in front of the target voxel X in the same layer as the voxel A in the first scanning direction and the second scanning direction, are used as reference voxels. The order of A, B, C, D, and E indicates the ranks of the reference voxels. With regard to the ranks of the reference voxels, reference voxels that are closer toward the target voxel are higher-ranked. If the distance from the target voxel is the same, a voxel located in the link direction relative to the target voxel is higher-ranked than a voxel not located in the link direction relative to the target voxel. In the example in FIG. 2, the link direction is aligned with the direction in which layers are stacked in the fabrication process (stacking direction). Therefore, the voxel A located in the link direction (which is also the stacking direction in this example) relative to the voxel X is higher-ranked than the voxels B and C that are not located in the link direction relative to the voxel X. Furthermore, with regard to the ranks of reference voxels located at the same distance from the target voxel in the layer, the reference voxel located in the first scanning direction relative to the target voxel is higher-ranked than the reference voxel located in the second scanning direction.

Figure 3:
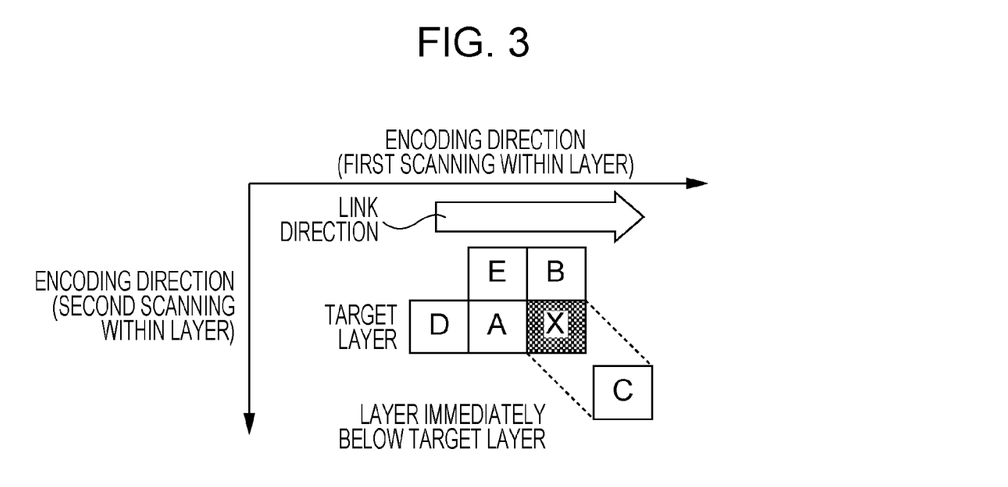
FIG. 3 illustrates another example of the relationship between the link direction and reference voxels used for encoding.

In an example shown in FIG. 3, the link direction is aligned with the first scanning direction for encoding within the layer. In this case, the voxel located in front of the target voxel X in the first scanning direction is the reference voxel A at the highest rank, and the voxel located in front of the target voxel X in the second scanning direction is the reference voxel B at the second highest rank. Moreover, the voxel located immediately below the target voxel X is the reference voxel C at the third highest rank. In a case where (A) voxels become higher-ranked with decreasing distance from the target voxel X and (B) voxels are located at the same distance therefrom, the ranks of the reference voxels are set in accordance with a rule in which the ranks decrease in the following order: a voxel located in the first scanning direction, which is the link direction, relative to the target voxel, a voxel located in the second scanning direction, and a voxel located in a lower layer.

Figure 4:
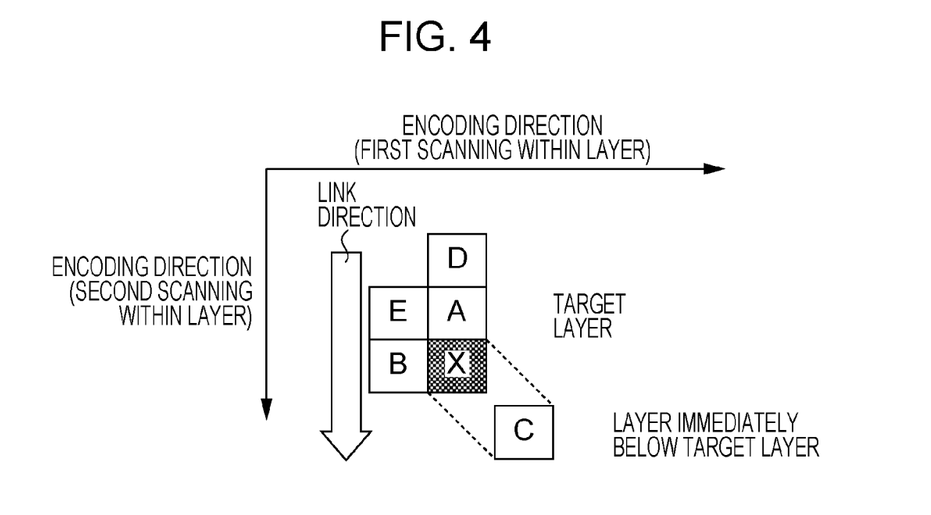
FIG. 4 illustrates another example of the relationship between the link direction and reference voxels used for encoding.

In an example shown in FIG. 4, the link direction is aligned with the second scanning direction for encoding within the layer. In this case, in a case where (A) voxels become higher-ranked with decreasing distance from the target voxel X and (B) voxels are located at the same distance therefrom, the ranks of the reference voxels are set in accordance with a rule in which the ranks decrease in the following order: a voxel located in the first scanning direction, which is the link direction, relative to the target voxel, a voxel located in the second scanning direction, and a voxel located in a lower layer.

Figure 2:
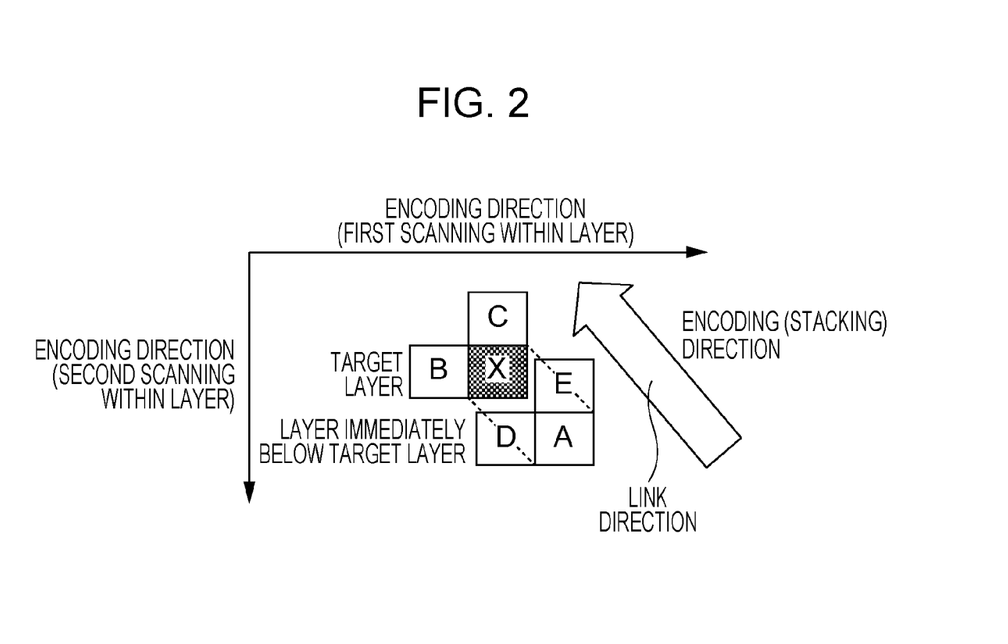
FIG. 2 illustrates an example of the relationship between a link direction and reference voxels used for encoding.

It is assumed that the encoding device includes five predicting units 14 that perform predictions by referring to the five reference voxels shown in FIG. 2, and that each predicting unit 14 sets a value of the corresponding reference voxel as a prediction value of the target voxel X. In this case, if the predicting unit 14-1 performs the prediction by using the prediction expression X=A, the reference voxel A is the link-direction voxel and is one voxel located at the shortest distance from the target voxel X. Thus, a shortest code is set in correspondence with the predicting unit 14-1, and if the prediction is correct, the predicting unit 14-1 is selected with the highest priority by the selecting unit 18. Assuming that the predicting units 14-2, 14-3, 14-4, and 14-5 perform predictions using the prediction expressions X=B, X=C, X=D, and X=E, respectively, short codes are allocated to the respective predicting units 14 in the order of the ranks of the corresponding reference voxels B, C, D, and E. If multiple predicting units 14 simultaneously make the correct predictions, the predicting units 14 are preferentially selected in the order of the ranks.

Furthermore, it is assumed that the predicting units 14 included in the encoding device use the prediction expressions X=A, X=B, X=C, and X=(A+D)/2 in the arrangement example of the reference voxels in FIG. 2. For example, each reference voxel may be given a score based on the distance and the direction from the target voxel, a score of the corresponding predicting unit 14 may be determined from the score of the reference voxel in the prediction expression used by the corresponding predicting unit 14, and the predicting units 14 may be ranked in the order of the scores. For example, in a case where a scoring rule is used in which 4 points are given if the distance from the target voxel is one voxel, 1 point is given if the distance is two voxels, 3 points are given if the voxel is located in the link direction, and 1 point is given if the voxel is located in the first scanning direction for encoding relative to the target voxel, the reference voxel A has a score of 7 points, the reference voxel B has a score of 5 points, the predicting unit 14 that predicts that X=A has a score of 7 points, and the predicting unit 14 that predicts that X=B has a score of 5 points. With regard to a predicting unit 14 that uses a prediction expression that includes a division, as in X=(A+D)/2, for example, if a score is determined by similarly performing a division on the score of the reference voxel in the prediction expression, the score obtained is 4 points. By setting the ranks of the predicting units 14 based on the scores determined in this manner, codes may be allocated to the predicting units 14 by using these ranks, and the selection when multiple predicting units 14 simultaneously make correct predictions may be performed.

The reference voxels A to E shown in FIGS. 2 to 4 are merely examples. Voxels other than the voxels A to E and having positional relationships with the target voxel X may be used as reference voxels.

Although several examples have been described above, if there are multiple predicting units 14 with the same condition other than a condition of whether or not a voxel is a link-direction voxel (e.g., the distance from the target voxel X) in any of the methods, predicting units with the higher degree of contribution of the link-direction voxel are set at higher ranks (i.e., a score indicating that a voxel is located in the link direction in the above example).

Accordingly, each predicting unit 14 is preliminarily ranked in accordance with the prediction expression used by the predicting unit 14 (and the reference voxel used in the expression). This rank information is stored in the selecting unit 18. Moreover, the encoding unit 20 allocates shorter codes to higher-ranked predicting units 14 in accordance with the ranks.

Each predicting unit 14 compares the prediction value calculated by the predicting unit 14 with the value of the target voxel X. If the two values match, that is, if the prediction is correct, the predicting unit 14 transmits a signal indicating that the prediction is correct to the selecting unit 18. If the two values do not match, the predicting unit 14 transmits a signal indicating that the prediction is incorrect to the selecting unit 18.

In case the predictions by the N predicting units 14 are all incorrect, the prediction-error calculating unit 16 calculates a difference between the value of the target voxel X predicted in accordance with a predetermined method (e.g., a method identical to that used by a specific one of the predicting units 14) and an actual value of the target voxel, and outputs the difference as a prediction error. The prediction-error calculating unit 16 may determine a difference between a prediction result obtained by the predicting unit 14 at the highest rank set in accordance with the link direction of the target voxel and the value of the target voxel as a prediction error.

Figure 5:
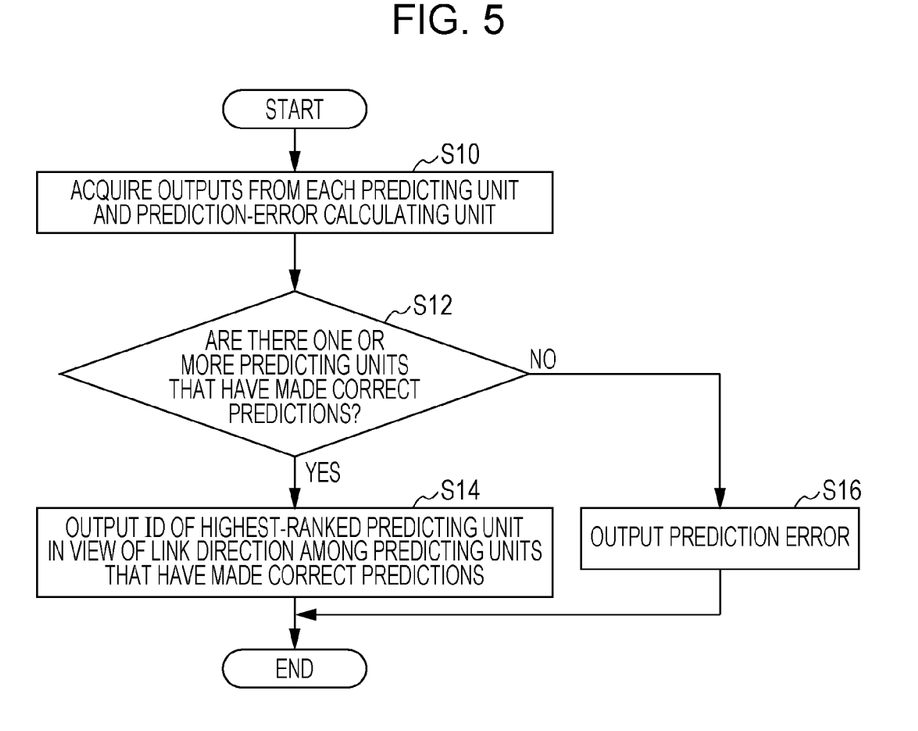
FIG. 5 illustrates an example of a procedure of a process performed by a selecting unit.

The selecting unit 18 receives information from the N predicting units 14 and information from the prediction-error calculating unit 16, selects one of the two pieces of the received information, and transmits the selected information to the encoding unit 20. An example of a procedure of a process performed by the selecting unit 18 is shown in FIG. 5.

In this procedure, when the selecting unit 18 receives information output from the N predicting units 14 and the prediction-error calculating unit 16 in step S10, the selecting unit 18 determines whether there are one or more predicting units 14 that have made correct predictions from the received information in step S12. If there are one or more predicting units 14 that have made correct predictions (i.e., if the determination result in step S12 indicates "Yes"), the identification information (ID) or the rank of the highest-ranked predicting unit 14 among the predicting units 14 that have made correct predictions is output to the encoding unit 20 in step S14. If there is even a single predicting unit 14 that has made a correct prediction, the ID of the predicting unit 14 is output to the encoding unit 20. If the determination result in step S12 indicates "No", the selecting unit 18 outputs a prediction error received from the prediction-error calculating unit 16 to the encoding unit 20 in step S16.

The encoding unit 20 encodes the information received from the selecting unit 18. As mentioned above, the encoding of the IDs of the predicting units 14 involves allocating shorter codes to predicting units 14 with higher ranks given thereto in view of the link direction. Codes to be allocated are set in advance. Furthermore, a prediction-error encoding process involves adding a prediction-error value after a code indicating an incorrect prediction. The process performed by the encoding unit 20 may be similar to that described in Japanese Patent No. 2888186 (e.g., see FIG. 4) except that shorter codes are allocated to predicting units 14 with higher ranks given thereto in view of the link direction. The codes to be used may be entropy codes, such as Huffman codes, but are not limited thereto. Encoded data output from the encoding unit 20 will be referred to as "first encoded data".

The output unit 22 outputs the first encoded data, generated by the encoding unit 20, in correspondence with link encoded data generated by the link-information encoding unit 12.

Figure 6:
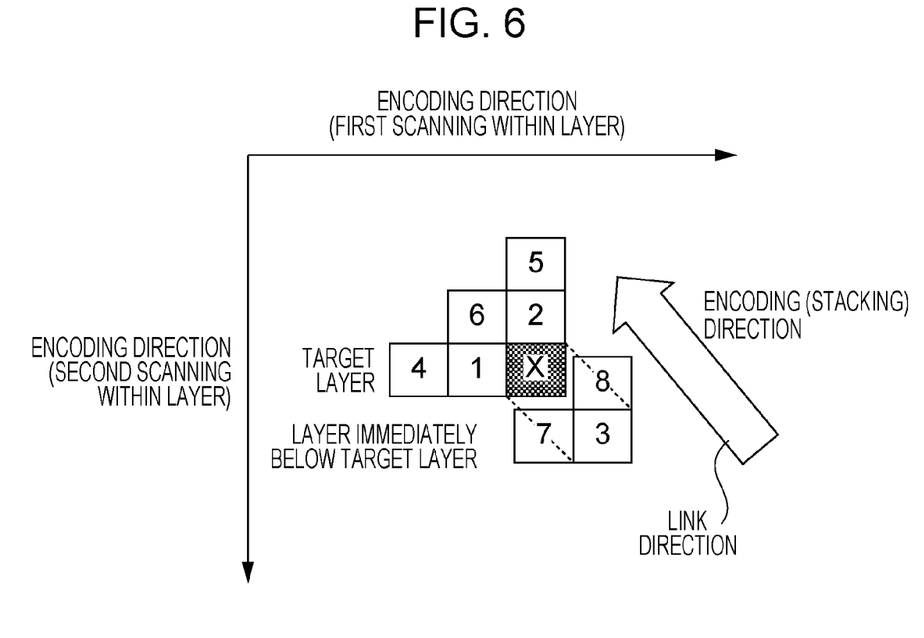
FIG. 6 illustrates an example of identification numbers allocated to individual reference voxels with reference to an encoding progressing direction.

It is apparent from FIGS. 2 to 4 that, when the relationship between the link direction and the encoding progressing direction (i.e., the first scanning direction within the layer, the second scanning direction within the layer, or the layer progressing (stacking) direction) changes, the ranks of the reference voxels change. As shown in FIG. 6, it is assumed that identification numbers are allocated to the reference voxels with reference to the encoding progressing direction, starting from 1. In this case, the reference voxel A at the highest rank is a voxel with an identification number 3 if the link direction has the relationship shown in FIG. 2 with the encoding progressing direction (i.e., link direction=layer progressing direction), is a voxel with an identification number 1 in the case of the relationship shown in FIG. 3, or is a voxel with an identification number 2 in the case of the relationship shown in FIG. 4. When the link direction is set, the ranks of the voxels with the respective identification numbers are also set accordingly. Therefore, in the encoding process, the ranks of the predicting units 14 may have to be determined in accordance with such changes in the ranks of the reference voxels according to the link direction. For achieving this, there are two methods described below.

In a first method, it is assumed that the prediction expressions used by the predicting units 14 indicate the reference voxels used in the predictions by using the identification numbers (see FIG. 6) determined from the encoding progressing direction. For example, the predicting unit 14-1 uses a prediction expression in which the voxel with the identification number 1 is set as a prediction value (X=1), the predicting unit 14-2 uses a prediction expression in which the voxel with the identification number 2 is set as a prediction value (X=2), and so on. In this case, by determining the link direction of the target voxel, the ranks of the reference voxels included in the prediction expressions of the predicting units 14 are determined, so that the scores of the predicting units 14 are determined from the ranks of these reference voxels based on a method similar to that described above with reference to FIG. 2. Then, the ranks of the predicting units 14 are set based on the scores of the predicting units 14 determined in this manner. For example, assuming that the predicting units 14-1, 14-2, 14-3, 14-4, and 14-5 perform predictions using the prediction expressions X=1, X=2, X=3, X=4, and X=5, respectively, (the numerical values of 1 to 5 being identification numbers of the respective reference voxels) and that the relationship between the encoding progressing direction and the link direction is as shown in FIG. 2, the ranks of the predicting units 14 are set such that the highest rank is the predicting unit 14-3, the second highest rank is the predicting unit 14-1, the third highest rank is the predicting unit 14-2, and so on.

In the case of the first method, the position of each reference voxel, relative to the target voxel, used in the prediction expression of the corresponding predicting unit 14 is fixedly set with respect to the encoding progressing direction. Therefore, the predicting units 14 may read the attribute values of the reference voxels whose positions are fixedly set, and may determine prediction values by applying these attribute values to the prediction expressions. The predicting units 14 do not have to have information about the link direction for such a process. On the other hand, the selecting unit 18 ranks the predicting units 14 based on the information about the link direction, and notifies the encoding unit 20 of the identification number of the highest-ranked predicting unit 14 among predicting units 14 that have made correct predictions. The encoding unit 20 allocates shorter codes to higher-ranked predicting units 14 determined from the link direction, and outputs codes corresponding to the identification numbers notified by the predicting units 14 as encoded results. Ultimately, these codes indicate the code of the rank of the highest-ranked predicting unit 14 that has made a correct prediction.

In a second method, it is assumed that the prediction expressions used by the predicting units 14 indicate the reference voxels used in the predictions by using ranks. For example, the predicting units 14-1, 14-2, 14-3, 14-4, and 14-5 use the prediction expressions $X=A$, $X=B$, $X=C$, $X=D$, and $X=E$, respectively. In this case, A, B, C, D, and E are signs indicating the ranks of the reference voxels (A being the highest rank, B being the second highest rank, and so on). In this method, the ranks of the predicting units 14 are already set (in the order: the predicting units 14-1, 14-2, 14-3, and so on in the above example). This is because, in the prediction expression of each predicting unit 14, which reference voxel at which rank is to be used is already set. In this method, the information about the link direction of the target voxel is also supplied to each predicting unit 14. The predicting units 14 identify the identification numbers of the reference voxels corresponding to the ranks of A to E based on the information about the link direction (see FIG. 6), determine the identification numbers of the reference voxels to be used in their own prediction expressions, read the attribute values of the reference voxels corresponding to the determined identification numbers, and applies the read attribute values to the respective prediction expressions. The selecting unit 18 notifies the encoding unit 20 of the identification information of the highest-ranked predicting unit 14 (i.e., the rank of the predicting unit 14) among the predicting units 14 that have made correct predictions. The encoding unit 20 allocates shorter codes to higher-ranked predicting units 14, and outputs codes corresponding to the identification information (i.e., the ranks) notified by the predicting units 14 as encoded results.

Figure 7:
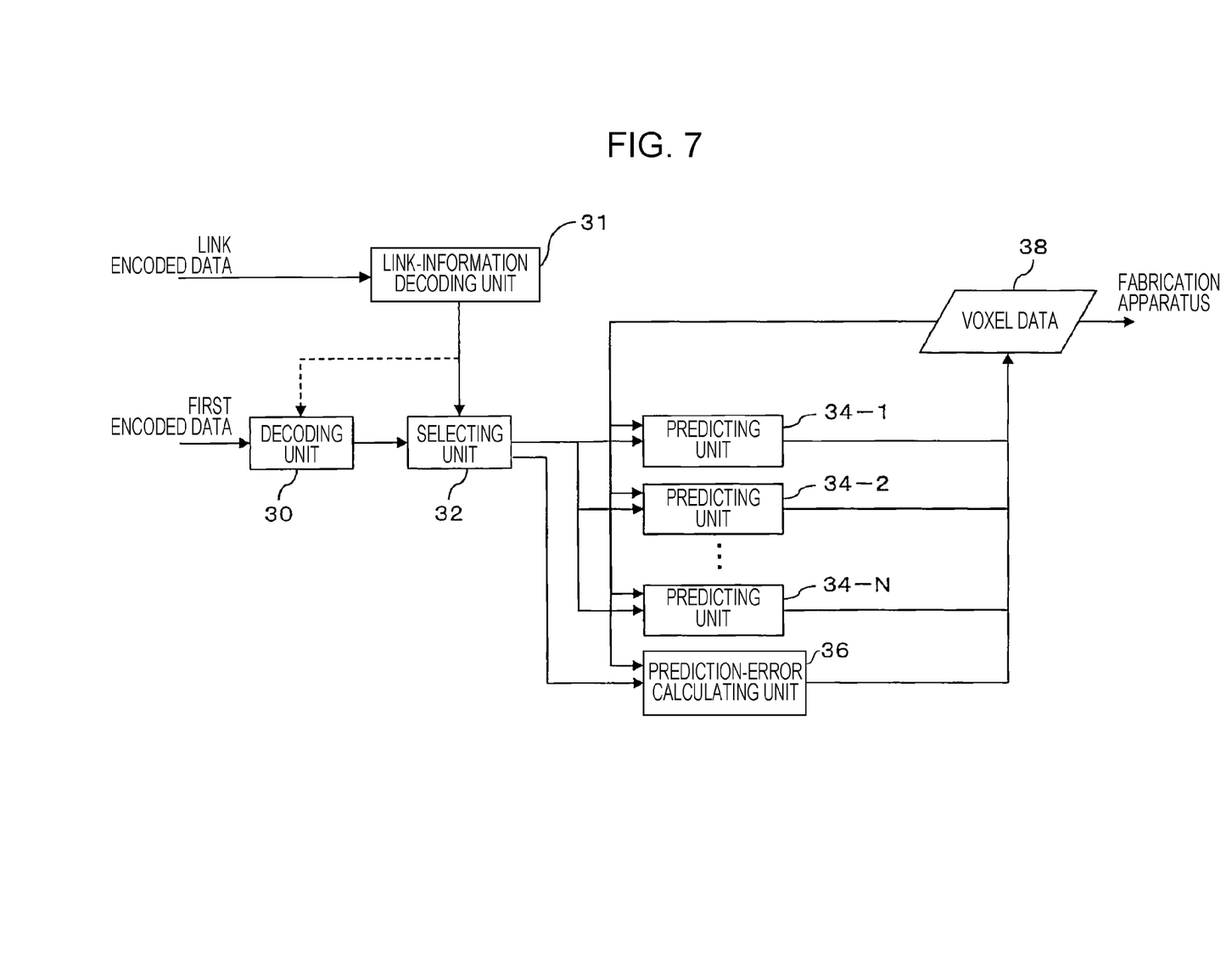
FIG. 7 illustrates an example of a functional configuration of a decoding device.

The encoded data generated in this manner may be decoded by executing a reverse process of the encoding process. FIG. 7 illustrates the configuration of a decoding device. This decoding device receives the first encoded data and the link encoded data generated by the encoding device in FIG. 1.

Predicting units 34-1, 34-2, ..., and 34-N (collectively referred to as "predicting units 34" hereinafter) are respectively identified based on identification information (ranks) identical to those of the predicting units 14-1, 14-2, ..., and 14-N, and each predict the value of the target voxel using the same prediction expressions. For example, the predicting unit 34-1 has the same identification information (or rank) as the predicting unit 14-1 and predicts the value of the target voxel using the same prediction expression as the predicting unit 14-1.

A decoding unit 30 sequentially decodes input first encoded data, starting from the leading item. A value of the decoded result indicates the rank of the highest-ranked predicting unit 14 that has made a correct prediction in the encoding device or indicates an incorrect prediction. In the latter case, the decoding unit 30 decodes the value since encoding of a prediction error follows thereafter.

A link-information decoding unit 31 decodes input link encoded data so as to reproduce link information for each target voxel.

If the decoded result received by a selecting unit 32 from the decoding unit 30 indicates the rank of the highest-ranked predicting unit 14 that has made a correct prediction, the selecting unit 32 transmits a prediction command to the predicting unit 34 corresponding to the rank.

If the predicting units 14 and 34 use the first method (i.e., the method of identifying reference voxels using identification numbers in FIG. 6), the selecting unit 32 ranks the predicting units 34 in accordance with the link direction determined from the reproduced link information. This ranking process may be performed similarly to the ranking process of the predicting units 14 of the encoding device. Then, a command for executing a prediction is transmitted to the predicting unit 14 corresponding to the rank indicated by the decoded result. The predicting unit 14 receiving this command performs a prediction by applying the attribute value of the reference voxel of each identification number referred to by the predicting unit 14 to the prediction expression.

If the predicting units 14 and 34 use the second method (i.e., the method of identifying the reference voxels using ranks), the ranks of the predicting units 34 are also already set. In this case, the selecting unit 32 transmits a command for executing a prediction to the predicting unit 34 corresponding to the rank indicated by the decoded result. The predicting unit 34 receiving the command determines the identification number (which is uniquely set from the encoding progressing direction, see FIG. 6) of each reference voxel (indicated by a rank in the prediction expression) referred to by the predicting unit 34 based on the link information of the target voxel identified from the link information decoded by the link-information decoding unit 31. Then, the predicting unit 34 performs a prediction by applying the attribute value of each reference voxel corresponding to each determined identification number to the prediction expression.

Then, the selected predicting unit 34 writes the value of the prediction result as the value of the target voxel in a memory area of voxel data 38.

If the decoded result from the decoding unit 30 indicates an incorrect prediction, the selecting unit 32 inputs a subsequently-received prediction error value to a prediction-error adding unit 36. The prediction-error adding unit 36 predicts the value of the target voxel using the same method as the prediction-error calculating unit 16 of the encoding device. A result obtained by adding the input prediction error to the prediction value is written as the value of the target voxel in the memory area of the voxel data 38.

As an alternative the example described above in which the selecting unit 32 selects one of the predicting units 34 and causes the selected predicting unit 34 to execute a prediction, another control is possible. Specifically, the N predicting units 34 may all be caused to execute predictions, and the selecting unit 32 may select one of the prediction results of the predicting units 34 as an ultimate decoded result with respect to the target voxel.

The voxel data 38 decoded by the decoding device in this manner is used in the fabrication process performed by the fabrication apparatus.

The above example uses the combination of the method of allocating shorter codes to predicting units with higher contribution of the reference voxel in the link direction with respect to the target voxel and the method of preferentially selecting predicting units with higher contribution of the reference voxel in the link direction with respect to the target voxel if there are multiple predicting units that have made correct predictions. However, the two methods do not necessarily have to be combined. With an encoding device and a decoding device that use only one of the methods, enhanced encoding efficiency may still be expected to a certain extent.

Figure 8:
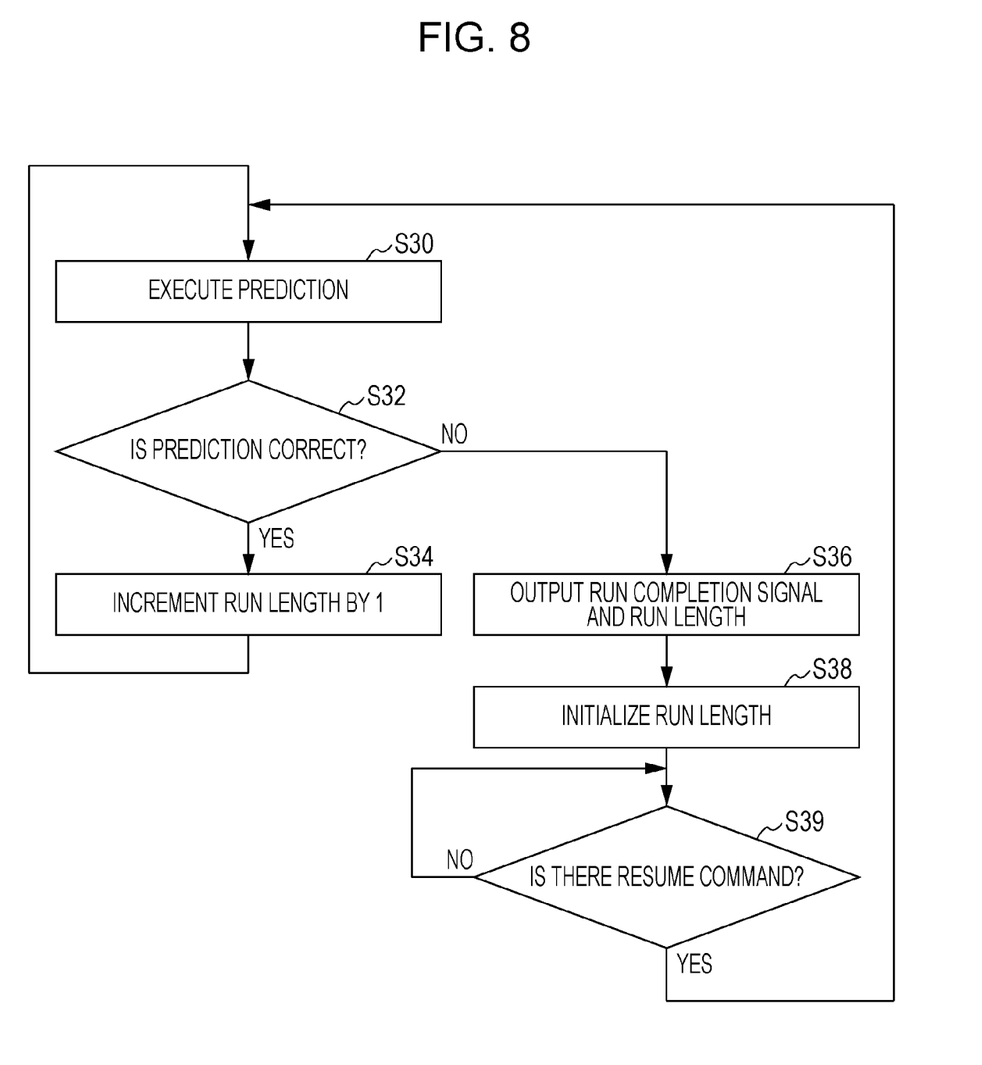
FIG. 8 illustrates an example of a procedure of a process performed by a predicting unit of the encoding device in a case where run-length encoding is performed.
Figure 9:
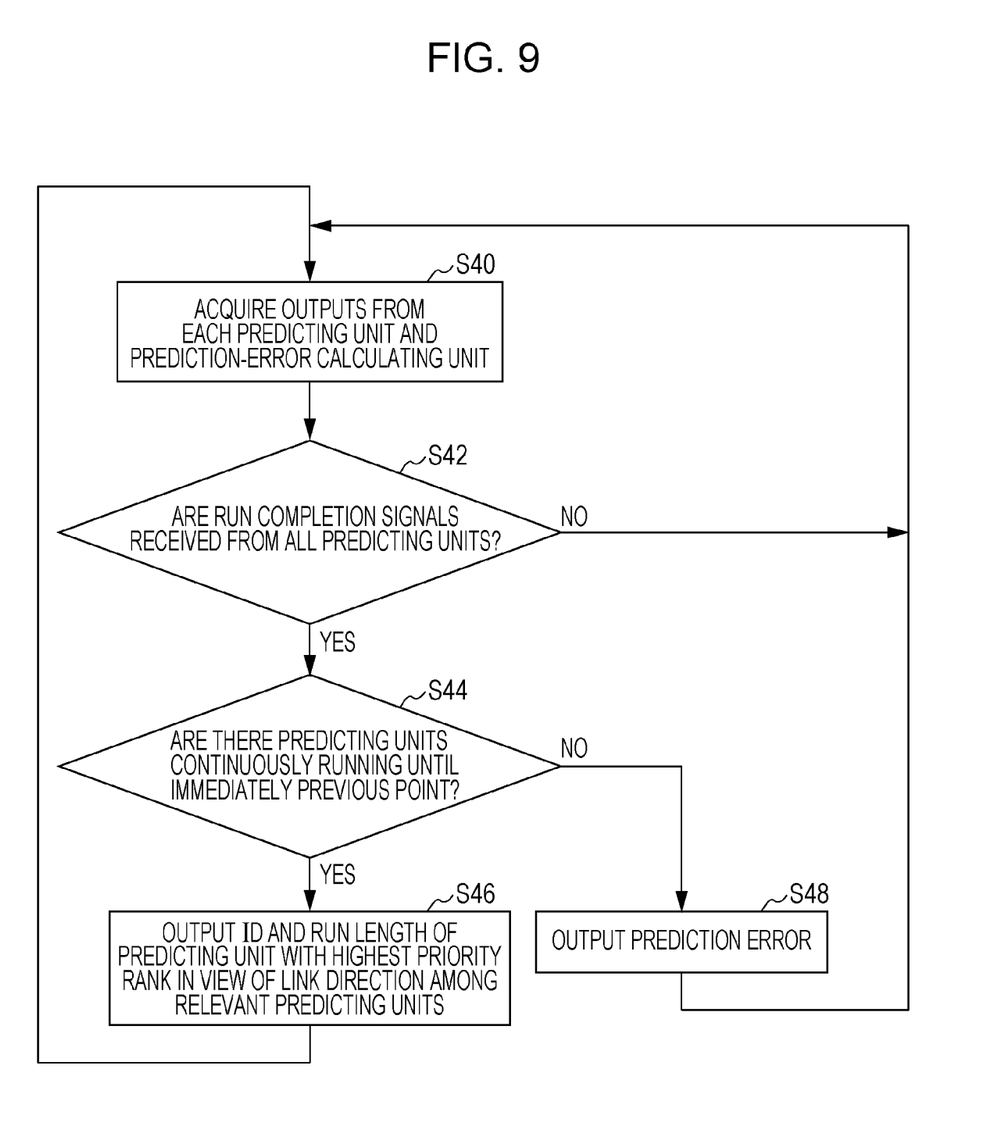
FIG. 9 illustrates the example of the procedure of the process performed by the predicting unit of the encoding device in a case where run-length encoding is performed.

It is also possible to apply run-length encoding to the above-described technique. FIGS. 8 and 9 illustrate a procedure of a process performed by each predicting unit 14 and the selecting unit 18 of the encoding device in a case where run-length encoding is performed.

As shown in FIG. 8, the predicting unit 14 predicts a value of a target voxel by using at least one reference voxel in step S30, and determines in step S32 whether or not the prediction value matches the value of the target voxel. If it is determined that the two values match, the predicting unit 14 increments a stored value of a run length counter by 1 in step S34, and returns to step S30 to process a subsequent target voxel.

If it is determined in step S32 that the prediction value does not match the value of the target voxel, the predicting unit 14 outputs a run completion signal indicating that the run is completed and a value (run length) indicated by the run length counter to the selecting unit 18. If the prediction of the first voxel is incorrect, the run length to be output to the selecting unit 18 is 0.

Then, the predicting unit 14 initializes the value of the run length counter to 0 and waits until a resume command is received from the selecting unit 18 in step S39. During this waiting period, another predicting unit 14 may be making a correct prediction. When a resume command is received from the selecting unit 18, the process resumes starting from the voxel indicated in the command, and the process from step S30 to step S39 is performed.

Referring to FIG. 9, in the case of the run-length encoding, the selecting unit 18 first acquires information output from each predicting unit 14 and the prediction-error calculating unit 16 in step S40. Then, every time the information is acquired, the selecting unit 18 determines in step S42 whether run completion signals are received from all of the N predicting units 14. If the determination result indicates "No", the information about the prediction error received from the prediction-error calculating unit 16 is discarded, and the process returns to step S40 where the selecting unit 18 acquires outputs with respect to a subsequent target voxel from each predicting unit 14 and the prediction-error calculating unit 16.

If the determination result in step S42 indicates "Yes", the selecting unit 18 determines in step S44 whether there are predicting units 14 that have been running until an immediately previous point. If the predictions by the N predicting units 14 are all incorrect with respect to a target voxel immediately upon completion of the previous run (i.e., if the run lengths of all predicting units 14 are 0), the determination result in step S44 indicates "No". Otherwise, the determination result indicates "Yes". If the determination result indicates "Yes", the selecting unit 18 identifies the highest-ranked predicting unit 14 in view of the aforementioned link direction among the predicting units 14 that have been running until an immediately previous point, that is, the predicting units 14 with the maximum run length transmitted to the selecting unit 18 together with the run completion signals, and outputs the ID and the run length of the identified predicting unit 14 to the encoding unit 20 in step S46. If the determination result in step S44 indicates "No", the selecting unit 18 outputs the prediction error received from the prediction-error calculating unit 16 to the encoding unit 20 in step S48.

Accordingly, the selecting unit 18 notifies the encoding unit 20 of the highest-ranked predicting unit 14 in view of the link direction among the predicting units 14 with the maximum run lengths.

The decoding device that decodes a code obtained as a result of this run-length encoding process executes a reverse process of the encoding device so as to decode the first encoded data. A description of the mechanism of this decoding process will be omitted since it is readily presumable from, for example, the example in FIG. 4. With regard to this decoding process, refer to Japanese Patent No. 3885413, if necessary, since the decoding process may be similar to the procedure shown in FIG. 3 in Japanese Patent No. 3885413.

Next, a modification of the above exemplary embodiment will be described. In the above exemplary embodiment, the encoding process involving prioritizing a predicting unit 14 with a high degree of contribution of the reference voxel located in the link direction (such as the direction with the strongest link) relative to a target voxel is performed. In contrast, in this modification, with regard to encoding of voxels of the same material, an encoding process involving prioritizing a predicting unit 14 with a high degree of contribution of the reference voxel located in the direction with the weakest link (i.e., the predicting unit 14 with the lowest score in the above example) is performed. Specifically, shorter codes are allocated to predicting units 14 with higher degrees of contribution of the reference voxel located in the direction with the weakest link, and in a case where there are multiple rivaling predicting units 14 that have made correct predictions, if the predicting unit 14 with the highest degree of contribution of the reference voxel located in the direction with the weakest link is included, the rank or the identification number of the predicting unit 14 is encoded. This is based on the following concept.

Specifically, in a fabrication process involving causing shapes to develop in a layer-by-layer fashion in a direction perpendicular to a layer surface, the link strength between voxels is high in a direction in which the fabrication progresses within each layer, whereas the strength between layers is lower than the link strength. In each layer, a material interposed between adjacent voxels is supplied in a melted or soft state to the positions of the voxels and moves closer toward each other with time and eventually solidifies. When a first layer is completely fabricated and a second layer is to be subsequently fabricated thereon, the first layer has substantially solidified, and the material of the voxels in the second layer is shared over the substantially solidified first layer. The link between adjacent voxels that solidify substantially at the same time from the soft state (i.e., the link strength) is stronger than the link between voxels when a material of another voxel is supplied and solidified adjacent to a substantially solidified voxel. If there is a solid object at a voxel position, there is a high possibility that there is a solid object also at a voxel position directly below the aforementioned voxel position (otherwise, the fabrication process involving causing shapes to develop in a layer-by-layer fashion becomes difficult). Therefore, if there is a solid object at a voxel position, there is a high possibility that there may be a solid object of the same material directly below that voxel position. According to these properties, by performing a predictive encoding process involving prioritizing the direction with the weakest link (i.e., the direction directly below the target voxel), the process for encoding a material attribute value of a voxel is made more efficient.

The following description relates to how this modification is effective with regard to encoding of voxels of the same material.

The stacking direction included in the fabricating direction is normally designated by the designer of a fabrication object since the stacking direction affects the amount of a support material (which is for forming a support that supports a lower support-less section of the structure of the fabrication object and that is to be removed upon completion of the fabrication process). On the other hand, the fabricating direction within the same layer is not affected by the amount of the support material and is rarely designated in detail by the designer due to the specifications of each fabrication apparatus, and is thus often completely left to the fabrication apparatus side. Under such assumptions, the designer may sometimes uniformly set the link direction and the strength within the same layer. In view of, for example, the strength of the fabrication object, it is desirable that, when the fabrication object is to be designed, the direction of a tool path (e.g., a path along which a head for supplying a fabrication material moves) be assumed and that the link direction and the strength be set in the assumed direction. However, it is possible that the designer does not perform the setting process in detail and uniformly sets the link direction and the strength, as mentioned above. In such a case, the attributes of the link direction and the strength uniformly set for voxels of a layer are similarly set for voxels along the edges of the same layer. When the setting process is performed in this manner, the voxels along the edges may include those without voxels at voxel positions within the same layer indicated by the link direction set for the voxels (since such voxels are located along the edges). With regard to the voxels along the edges, if the predictive encoding process according to the above exemplary embodiment involving prioritizing a predicting unit 14 with a high degree of contribution of the reference voxel located in the link direction (i.e., the direction with the strongest link) is performed, there is a possibility of reduced encoding efficiency. For such voxels along the edges, the encoding efficiency is rather enhanced by performing a predictive encoding process involving prioritizing a reference voxel located in the stacking direction and having a weak link with the target voxel.

The encoding device and the decoding device described above are configurable as hardware logical circuits in one example. As another example, each of the encoding device and the decoding device may be realized by causing a computer that contains the device to execute a program expressing the functions of the functional modules within the device. The computer has a circuit configuration in which hardware components are connected via, for example, a bus. Examples of the hardware components include a processor, such as a central processing unit (CPU), memory devices (temporary storage devices), such as a random access memory (RAM) and a read-only memory (ROM), a hard-disk-drive (HDD) controller that controls the HDD, various types of input/output (I/O) interfaces, and a network interface that performs control for connecting with a network, such as a local area network. The bus may be connected, via the I/O interface, to a disk drive for reading and/or writing information from/to a portable disk storage medium, such as a compact disc (CD) or a digital versatile disk (DVD), or to a memory reader-writer for reading and/or writing information from/to portable nonvolatile storage media of various standards, such as a flash memory. The program describing the processing contents of the functional modules mentioned above is stored in a stationary storage device, such as a hard disk drive, via a storage medium, such as a CD or a DVD, or via a communication unit, such as a network, and is installed in the computer. The program stored in the stationary storage device is loaded in the RAM and is executed by the processor, such as the CPU, so that the group of functional modules mentioned above is realized. Alternatively, the encoding device and the decoding device may each be constituted of a combination of software and hardware.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiment were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An encoding device comprising:
    a voxel-data acquiring unit that acquires voxel data expressing a three-dimensional object to be fabricated and containing, for each voxel constituting the three-dimensional object, a value of the voxel and link information indicating a link direction of the voxel; and
    an encoding unit that encodes the voxel data by setting a code based on a predicting unit that has made a correct prediction of a value of a target voxel among a plurality of predicting units that predict the value of the target voxel based on a value of at least one reference voxel surrounding the target voxel, the target voxel being encoded based on the link direction of the target voxel, wherein the link direction of the target voxel is extended from the target voxel toward a neighboring voxel with the maximum link strength.

2. The encoding device according to claim 1, further comprising:
    a controller that controls the encoding unit such that a shorter code is allocated to the predicting unit with a higher degree of contribution to a prediction of the reference voxel located in the link direction relative to the target voxel, the predicting unit being one of the predicting units having identical conditions other than a direction of the at least one reference voxel used for the prediction relative to the target voxel.

3. The encoding device according to claim 2, further comprising:
    a controller that controls the encoding unit such that, in a case where multiple predicting units have made correct predictions among the plurality of predicting units, a code is set based on any one of the predicting units, having made the correct predictions, with a highest degree of contribution to a prediction of the reference voxel located in the link direction relative to the target voxel.

4. The encoding device according to claim 3, further comprising:
an extracting unit that extracts the link information of each voxel from the voxel data; and
an output unit that outputs encoded data, serving as an encoded result of the voxel data obtained by the encoding unit, and the link information extracted by the extracting unit in correspondence with each other.

5. The encoding device according to claim 2, further comprising:
an extracting unit that extracts the link information of each voxel from the voxel data; and
an output unit that outputs encoded data, serving as an encoded result of the voxel data obtained by the encoding unit, and the link information extracted by the extracting unit in correspondence with each other.

6. The encoding device according to claim 1, further comprising:
a controller that controls the encoding unit such that, in a case where multiple predicting units have made correct predictions among the plurality of predicting units, a code is set based on any one of the predicting units, having made the correct predictions, with a highest degree of contribution to a prediction of the reference voxel located in the link direction relative to the target voxel.

7. The encoding device according to claim 6, further comprising:
an extracting unit that extracts the link information of each voxel from the voxel data; and
an output unit that outputs encoded data, serving as an encoded result of the voxel data obtained by the encoding unit, and the link information extracted by the extracting unit in correspondence with each other.

8. The encoding device according to claim 1, further comprising:
a controller that controls the encoding unit such that a shorter code is allocated to the predicting unit of the reference voxel located in a direction closer toward the link direction relative to the target voxel, the predicting unit being one of the predicting units having identical conditions other than a direction of the at least one reference voxel used for the prediction relative to the target voxel.

9. The encoding device according to claim 8, further comprising:
an extracting unit that extracts the link information of each voxel from the voxel data; and
an output unit that outputs encoded data, serving as an encoded result of the voxel data obtained by the encoding unit, and the link information extracted by the extracting unit in correspondence with each other.

10. The encoding device according to claim 1, further comprising:
an extracting unit that extracts the link information of each voxel from the voxel data; and
an output unit that outputs encoded data, serving as an encoded result of the voxel data obtained by the encoding unit, and the link information extracted by the extracting unit in correspondence with each other.

11. A decoding device comprising:
an input unit that receives the encoded data and the link information output from the output unit of the encoding device according to claim 10;
a plurality of decoding predicting units that determine a prediction value of a target voxel based on a value of at least one voxel surrounding the target voxel, each decoding predicting unit determining the prediction value by using a method identical to a method used by the predicting unit of the encoding device corresponding to identical identification information; and
an output unit that outputs, as a value of the target voxel corresponding to the input code, the prediction value obtained by the decoding predicting unit corresponding to a combination of the input code and the link direction indicated by the link information.

12. A non-transitory computer readable medium storing a program causing a computer to execute an encoding process, the encoding process comprising:
acquiring voxel data expressing a three-dimensional object to be fabricated, the voxel data containing, for each voxel constituting the three-dimensional object, a value of the voxel and link information indicating a link direction of the voxel; and
encoding the voxel data by setting a code based on a predicting unit that has made a correct prediction of a value of a target voxel among a plurality of predicting units that predict the value of the target voxel based on a value of at least one reference voxel surrounding the target voxel, the target voxel being encoded based on the link direction of the target voxel, wherein the link direction of the target voxel is extended from the target voxel toward a neighboring voxel with the maximum link strength.

* * * * *